US008942753B2

(12) United States Patent
Ho et al.

(10) Patent No.: US 8,942,753 B2
(45) Date of Patent: Jan. 27, 2015

(54) TELECOMMUNICATIONS NETWORK NODE AND METHODS

(75) Inventors: Lester T. W. Ho, Blanchardstown (IE); Holger Claussen, Straffan (IE)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/394,849

(22) PCT Filed: Aug. 3, 2010

(86) PCT No.: PCT/EP2010/004750
§ 371 (c)(1),
(2), (4) Date: May 22, 2012

(87) PCT Pub. No.: WO2011/029503
PCT Pub. Date: Mar. 17, 2011

(65) Prior Publication Data
US 2012/0225628 A1 Sep. 6, 2012

(30) Foreign Application Priority Data

Sep. 10, 2009 (EP) .................................... 09360042

(51) Int. Cl.
*H04B 7/00* (2006.01)
*H04W 52/34* (2009.01)
(Continued)

(52) U.S. Cl.
CPC ............. *H04W 52/343* (2013.01); *G06N 3/126* (2013.01); *H04W 24/02* (2013.01); *H04W 52/143* (2013.01); *H04W 52/325* (2013.01); *H04W 84/045* (2013.01)
USPC ........................................................ 455/522

(58) Field of Classification Search
USPC ................... 455/69, 115.1–115.4, 127.1, 522
See application file for complete search history.

(56) References Cited

U.S. PATENT DOCUMENTS 7,016,686 B2 * 3/2006 Spaling et al. ................. 455/453

7,693,536 B2 * 4/2010 Kogure ........................ 455/522
(Continued)

FOREIGN PATENT DOCUMENTS

WO WO 01/78434 A1 10/2001

OTHER PUBLICATIONS

John R. Koza, "Survey of Genetic Algorithms and Genetic Programming," Computer Science Department, Stanford University, Stanford, California, pp. 589-594, 1995.
(Continued)

*Primary Examiner* — Simon Nguyen
(74) *Attorney, Agent, or Firm* — Fay Sharpe LLP

(57) ABSTRACT

A telecommunications network node and methods are disclosed. The method is for generating, by genetic programming, evolved algorithms for adjusting base station transmission power to control coverage of a cell to assist in providing desired base station operating characteristics. The method comprises the steps of: generating, using predetermined functions and terminals defined in a functions and terminals list, a plurality of evolved algorithms each of which determine whether, for any particular base station operating conditions, to adjust said base station transmission power; determining a fitness level indicative of each evolved algorithm's ability to adjust base station transmission power to control coverage to achieve said desired base station operating characteristics under expected operating conditions; and iteratively performing said steps of generating and determining to generate further evolved algorithms using at least one of said evolved algorithms determined to have achieved a particular fitness level. In this way, it can be seen that algorithms can be assembled and then tested to see how suitable they are at controlling base station power to achieve particular operating characteristics under particular operating conditions. Those algorithms which are determined to be the best at achieving those characteristics under those particular operating conditions may then be used to generate further algorithms which, in turn, are also then assessed. Hence, those individual algorithms which are suited to the operating characteristics and the operating conditions can rapidly be generated thereby avoiding the need to manually design new algorithms which are specialized to particular environments.

15 Claims, 7 Drawing Sheets

(51) Int. Cl.
*G06N 3/12* (2006.01)
*H04W 24/02* (2009.01)
*H04W 52/14* (2009.01)
*H04W 52/32* (2009.01)
*H04W 84/04* (2009.01)

(56) References Cited

U.S. PATENT DOCUMENTS

| | | | |
|---|---|---|---|
| 2003/0104831 A1* | 6/2003 | Razavilar et al. | 455/522 |
| 2004/0229621 A1* | 11/2004 | Misra | 455/445 |
| 2006/0084391 A1* | 4/2006 | Chmiel | 455/69 |
| 2007/0149201 A1* | 6/2007 | Dominique et al. | 455/442 |
| 2008/0004064 A1* | 1/2008 | Sakurai et al. | 455/522 |
| 2008/0194280 A1* | 8/2008 | Thurfjell et al. | 455/522 |
| 2009/0042596 A1* | 2/2009 | Yavuz et al. | 455/522 |
| 2009/0067393 A1* | 3/2009 | Vinnakota | 370/338 |
| 2010/0091745 A1* | 4/2010 | Bevan et al. | 370/338 |
| 2010/0151870 A1* | 6/2010 | Piercy et al. | 455/450 |
| 2011/0287771 A1* | 11/2011 | Oyama | 455/446 |
| 2012/0093108 A1* | 4/2012 | Wengerter et al. | 370/329 |
| 2012/0270583 A1* | 10/2012 | Haykin | 455/507 |
| 2013/0225224 A1* | 8/2013 | Rofougaran | 455/522 |

OTHER PUBLICATIONS

L. Ho, "Self-Evolving Networks: High Performance, Scalable & Adaptive Solutions for Future Networks," Bell Labs Ireland Innovation Day, May 26, 2009.

Lee Spector, "Genetic Programming and AI Planning Systems," Genetic Algorithms, School of Communications and Cognitive Science, Hampshire College, Amherst, MA, 1994, pp. 1329-1334.

C. Maple et al., "Parallel Genetic Algorithms for Third Generation Mobile Network Planning," Proceedings of the International Conference on Parallel Computing in Electrical Engineering, IEEE, pp. 229-236, XP010757349, Sep. 7, 2004.

E. Alba et al., "Evolutionary Algorithms in Telecommunications," Electrochemical Conference, IEEE, pp. 795-798, XP010927871, May 16, 2006.

P. Polakos et al., "Beyond the Base Station Router . . . Not Your Parent's Flat Cellular Network," Internet Citation, 7 pages, XP007909376, retrieved on Jul. 31, 2009.

Jianjun Hu et al., "Wireless Access Point Configuration by Genetic Programming," Evolutionary Computation, Vo. 1, pp. 1178-1184, XP010720869, Jun. 19, 2004.

J.R. Koza, "Genetic Programming: On the Programming of Computers by Means of Natural Selection," Proceedings of Euro GP, pp. 1-35, XP003014098, Jan. 1, 1992.

International Search Report for PCT/EP2010/004750 dated Sep. 9, 2010.

* cited by examiner

Automated algorithm creation process.

TELECOMMUNICATIONS NETWORK NODE AND METHODS

FIELD OF THE INVENTION

The present invention relates to a telecommunications network node and methods.

BACKGROUND

Telecommunications networks increasingly incorporate abilities to self-configure, self-organise and self-adapt. As the size and complexity of telecommunications networks increases, there is a drive to implement these so-called "self-x" properties in a decentralised manner, namely where each node can act individually using only local information.

Accordingly, there is a growing need to develop self-x algorithms, i.e. algorithms for network node self-adaptation, that have to work without global information about the network nor coordinated central control of the network nodes.

A known approach is for self-x algorithms to be designed by skilled engineers, based on specific assumptions about the network that may not be realistic, so there is often a need for the algorithms to be evaluated, revised and refined after they have been implemented in networks. This can be a slow and expensive process.

In this known approach, it is difficult for the skilled engineer designing algorithms that take account of the various different environments that the nodes will be deployed in. The algorithms are designed based on specific assumptions about the network that often do not hold true in the real world.

In this known approach, a self-x algorithm is designed manually and then the same algorithm is applied across all of the network nodes of a certain type, for example all of the base stations in a wireless cellular network. As there are large differences in operating environments of the nodes, performance is degraded because generally-applicable optimisation algorithms perform less well than algorithms that are more specialised to a particular problem or operating environment. By the way, conversely, specialised algorithms perform less well when applied outside the particular area to which they are specialised.

It is desired to provide improved algorithms.

SUMMARY

According to a first aspect, there is provided a method of generating, by genetic programming, evolved algorithms for adjusting base station transmission power to control coverage of a cell to assist in providing desired base station operating characteristics, the method comprising the steps of: generating, using predetermined functions and terminals defined in a functions and terminals list, a plurality of evolved algorithms each of which determine whether, for any particular base station operating conditions, to adjust the base station transmission power; determining a fitness level indicative of each evolved algorithm's ability to adjust base station transmission power to control coverage to achieve the desired base station operating characteristics under expected operating conditions; and iteratively performing the steps of generating and determining to generate further evolved algorithms using at least one of the evolved algorithms determined to have achieved a particular fitness level.

The first aspect recognises that a problem with base station deployment is that the diversity of environments in which base stations are required to support a cell varies dramatically and this can affect the performance of the base stations. For example, the performance of a femto base station can vary drastically dependent upon where the femto base station is placed within a building. This is due in part to the effects of various building materials. For example, a glass wall has a very low propagation loss compared to a concrete wall. This is also due in part to the high variability of traffic demand. For example, a femto base station covering a traffic demand hot spot such as a busy lounge will experience demands that are very different to another femto base station covering a quiet area that is, say, only 20 meters away. The first aspect also recognises that the coverage control algorithms which are used to control and optimise the base station may not be adequate to deliver the appropriate performance in these diverse environments. For example, a femto base station operating in a low user demand residential area having building made of brick may need a radio coverage control algorithm that is of a different form to one operating in an high user demand enterprise area with glass-fronted buildings. Likewise, a femto base station operating in an area of high base station density may need a coverage control algorithm which is different to one operating in a low base station density area. However, to manually design and provision new algorithms for each different type of environment is impractical due to the complexity and cost involved.

Accordingly, a method of generating evolved algorithms which control coverage of a cell by adjusting base station transmission power is provided. A predetermined list of functions and terminals may be provided from which each evolved algorithm is generated. Each evolved algorithm may be able to determine whether, for any particular operating conditions that base station is experiencing, the base station transmission power should be adjusted. A fitness level may be determined which indicates the ability of each of those evolved algorithms to control cell coverage to achieve particular base station operating characteristics under the expected operating conditions of that base station. For example, desired base station operating characteristics may be the maximisation of user load, the minimisation of cell coverage gaps, the minimisation of cell overlap, the maximisation of quality of service, or one or more combinations of the above or other characteristics. The expected operating conditions may represent the conditions which that base station is actually expected to experience. For example, the expected operating conditions will differ depending on the expected location of the base station, the characteristics of the building within which the base station is to be placed and/or the expected user load at that location. The fitness level may then indicate the extent to which each evolved algorithm achieves the desired operating characteristics when experiencing the expected operating conditions. It is possible to rank each evolved algorithm in order of its ability to achieve the desired characteristics under those particular operating conditions. The algorithm or algorithms determined to be most suited to those conditions may then be selected and further evolved algorithms are generated from these, and the fitness of those further algorithms is then determined. In this way, it can be seen that algorithms can be assembled and then tested to see how suitable they are at controlling base station power to achieve particular operating characteristics under particular operating conditions. Those algorithms which are determined to be the best at achieving those characteristics under those particular operating conditions may then be used to generate further algorithms which, in turn, are also then assessed. Hence, those individual algorithms which are suited to the operating characteristics and the operating conditions can rapidly be generated thereby avoiding the need to manually design new algorithms which are specialised to particular environments.

Genetic programming is an evolutionary approach to generating an algorithm, see for example Koza, J. R., Genetic Programming: On the Programming of Computers by Means of Natural Selection 1992: MIT Press, 840. As shown in FIG. 1, genetic programming (GP) generally involves the following steps:

(i) initialise a population of algorithms—a population is the term used for a collection of individual algorithms, the algorithms in the initial population being generated at least somewhat randomly;
(ii) calculate the fitness of each of the algorithms in the population—fitness being the term used for a measure of the algorithms performance in achieving the task of the algorithm;
(iii) select algorithms to become "parents" based on their fitness;
(iv) create new algorithms by applying genetic operators, such as mutation and crossover to the parents selected in the previous step; and
(v) produce the next generation population of algorithms using newly created algorithms and survivors chosen from the previous generation population.

The above steps (ii) to (v) may be repeated until a termination condition is met (for example the process has gone through a set number of generations, or a target fitness level is met by an algorithm that has been created).

As shown in FIG. 2, a parse tree representation is typically used in genetic programming (GP) in order to encode an algorithm into a form upon which genetic programming operations can be performed. The parse tree can be used to represent various forms of algorithms, such as computer programs. Algorithms can be represented in other forms, such as by state transition diagrams.

FIGS. 3a and 3b show illustrative examples of the crossover and mutation operators mentioned above. Crossover is mixing components from two parent algorithms to produce a next generation (i.e. child) algorithm. Mutation is modifying part of an individual parent algorithm to produce a next generation algorithm.

In one embodiment, the functions comprise at least a conditional statement operable to select from different outcomes based on a relationship between a base station operating condition and its corresponding desired base station operating characteristic. The provision of a conditional statement enables an assessment of the relationship between a particular operating condition and a desired characteristic to rapidly be made, thereby assisting in the generation of appropriate algorithms.

In one embodiment, the conditional statement comprises an if_else statement operable to select a first outcome when the particular base station operating condition is greater than a predetermined threshold related to the corresponding desired base station operating characteristic and else to select a second outcome. These If else loops may be specialised forms of simple if_else loops with inputs of particular operating conditions, such as the predetermined threshold, built in directly. Using these specialised functions instead of using basic if_else loops helps to speed up the discovery of useful algorithms by the genetic programming procedure. The predetermined thresholds may be set according to the requirement of the network. Also, the use of these simple if_else loops provides a simple binary outcome to an assessment, which simplifies the genetic programming process and helps to speed the discovery of useful algorithms.

In one embodiment, the conditional statement comprises an if_X_large statement operable to select a first branch when X is larger than a predetermined threshold $X_{thr}$ and else to select a second branch. It will be appreciated that X may comprise one or more operating characteristics such as, for example, the coverage overlap O, the coverage gap D and the load L. It will be appreciated that the predetermined threshold $X_{thr}$ may comprise one or more genetic operator thresholds such as, for example, the proportion of measurement reports indicating more than one received pilot channel $O_{THR}$, the probability of users entering a coverage gap $D_{THR}$ and the maximum load capacity $L_{THR}$.

In one embodiment, the terminals comprise at least one of an increase, a decrease and no change in base station transmission power. Hence, only one of a small number of resultant terminals or actions may be provided, once again to simplify the genetic programming process and to speed the discovery of useful algorithms. The increase and decrease may cause a base station to increase and decrease their transmission power by particular preset increments.

In one embodiment, the step of determining comprises simulating operation of a base station when using each of the evolved algorithms under the expected operating conditions to generate simulated operating metrics and applying those simulated operating metrics to a fitness function representing the desired base station operating characteristics to determine the fitness level.

Hence, the determination of the fitness level may utilise, for example, a model simulating the operation of the base station under the expected operating conditions. That model may utilise the evolved algorithm being assessed as the coverage control algorithm in the base station. A range of simulated conditions are then applied to the base station which then utilises the evolved algorithm under those conditions to generate particular simulated operating metrics. For example, the model may generate, as those simulated operating metrics, simulated user load levels, coverage overlap, coverage gap, quality of service or one or more combinations of the above and other metrics when simulating operation using that evolved algorithm under those expected operating conditions. Those simulated operating metrics may then be provided to the fitness function to assess how well that algorithm is achieving the desired operating characteristics under those simulated operating conditions.

In one embodiment, operators of the fitness function are weighted to assist in adjusting the fitness function to represent adjustments in the desired base station operating characteristics. Weighting each operator of the fitness function may enable the fitness function to be readily adjusted to change the emphasis of different operating characteristics.

In one embodiment, the fitness function comprises:

$$F = \frac{w_D(1 - C_D) + w_O(1 - C_O) + w_L C_L}{w_D + w_O + w_L}$$

where F is the fitness level, $C_O$, $C_D$ and $C_L$ are a simulated mean of coverage overlap metric, a simulated mean coverage gap metric and a simulated load metric, respectively, and $w_O$, $w_D$ and $w_L$ are weightings. Hence, it can be seen that this example fitness function seeks to minimise coverage and overlap, whilst maximising load. It may be possible to change the relative importance of these operating characteristics by adjusting the values of the weightings. For example, decreasing the weighting of the overlap may decrease the importance of achieving a low overlap when assessing the evolved algorithms. Accordingly, with a reduced overlap weighting, those algorithms that fail to achieve a particularly low overlap may then be selected over those which do achieve a low overlap.

In one embodiment, the fitness function may be used to determine the quality of the potential algorithm when applied to a whole network in a centralised approach and to a local region of the network in a more distributed approach. Hence, the coverage overlap metric, coverage gap metric and load metric may be the mean of these values for that part of the network. In embodiments, these metrics may be normalised such that their values are $0 \leq C_x \leq 1$.

In one embodiment, $C_L$ is determined in accordance with the following algorithm:

$$C_L = \begin{cases} \frac{1}{N} \sum_{i=1}^{N} \frac{L_i}{L_{thr}} & \text{if } L_i \leq L_{thr} \\ 0 & \text{otherwise} \end{cases}$$

where N is the total number of cells in the network, $L_i$ is the load experienced by the base station i and $L_{thr}$ is a threshold set at or below a maximum load capacity of that base station. Hence, the load metric may increase as the base station takes up more load, but may drop to zero when the cell load exceeds a particular threshold (such as the capacity of the cell) to prevent overloading.

In one embodiment, the method comprises the steps of: selecting a desired one of the evolved algorithms and creating a decision table representative of the desired one of the evolved algorithms, the decision table being operable to indicate to a base station adjustments to the base station transmission power required for any particular base station operating conditions. Hence, rather than deploying the evolved algorithm itself in tree form to the base stations and requiring those base stations to make dynamic calculations, based on operating conditions it is experiences, a simple decision table may instead be provided to the base stations. The decision table may contain the calculated outcomes of a range of possible operating conditions. The base station then only needs to compare its current operating conditions to the decision table and select the appropriate power change, without needing to calculate that power change itself. It will be appreciated that this significantly reduces the processing load on the base station.

In one embodiment, the decision table contains an entry for each permutation of a relationship between a base station operating condition and an associated threshold, each entry indicating an adjustment to the base station transmission power required for that permutation. Accordingly, the decision table may contain an entry for each possible combination of operating characteristics when above or below the threshold values used by the evolved algorithm. It may then be possible to make an assessment in the base station of whether each operating condition is above or below those threshold values and select the appropriate entry to determine a change in transmission power.

In one embodiment, the adjustment to the base station transmission power required for each permutation is calculated by applying base station operating conditions representative of that permutation to the desired one of the evolved algorithms.

According to a second aspect of the present invention, there is provided a method of utilising an evolved algorithm for adjusting base station transmission power to control coverage of a cell to assist in providing desired base station operating characteristics, the method comprising the steps of: determining base station operating conditions; and applying the base station operating conditions to the evolved algorithm to determine whether to adjust the base station transmission power. Accordingly, a determination may be made of the current base station operating conditions and those operating conditions may then be applied to the evolved algorithm generated by the first aspect to determine whether or not to adjust base station power. It will be appreciated that this applying of base station operating conditions to the evolved algorithm may occur either directly or may occur indirectly via the use of a previously generated decision table representative of the evolved algorithm.

In one embodiment, wherein the base station operating conditions comprise at least one of a base station load, a coverage overlap and a coverage gap, and the step of determining comprises a corresponding at least one of: determining the base station load by measuring a highest load experienced by a base station over a predetermined period; determining the coverage overlap from received measurement reports indicating transmissions received from other base stations having a power greater than a predetermined threshold; and determining the coverage gap from information received indicative of at least one of numbers of handovers and numbers of dropped calls due to lack of coverage which have occurred. Hence, the operating conditions may comprise one or more of a base station load, cell coverage overlap and cell coverage gap. The base station load may be determined as the peak load on the base station during a particular time interval. Typically, the load will be voice traffic measured in Erlangs, although metrics of load may be used. The coverage overlap may be the proportion of the cell's total coverage area that is experiencing coverage overlap from neighbouring cells. In one embodiment, the overlap may be approximated using measurements sent back by user equipment and an area of overlapping coverage may be defined as an area where the user equipment measures pilot powers above a predetermined threshold from more than one cell. In one embodiment, the base station maintains a record of the total number, $M_{THR>1}$, of received measurement reports from user equipment where more than one pilot channel power measured by the user equipment is higher than the predetermined threshold. The overlap may then be estimated by the ratio of $M_{THR>1}$ to the total number of pilot power measurement set back by the cells user equipment $M_{TOTAL}$ i.e. $O = M_{THR>1}/M_{TOTAL}$. The coverage gap may represent the probability of users entering a coverage gap and may be calculated as $D = n_D/(n_D + n_F)$, where $n_D$ is the number of times a cell's user equipment enters a coverage gap, which can be derived from the number of handovers between the femto cell and any underlying cell such as, for example, a macro cell. Alternatively, if the cell underlay does not exist $n_D$ can be the number of times that users report back pilot power measurements that are below a minimum threshold. $n_F$ is the total number of users that have left the cell via, for example, a femtocell to femtocell handover.

In one embodiment, the evolved algorithm is represented by a decision table and the step of applying comprises applying the base station operating conditions to the decision table to indicate adjustments to the base station transmission power required for those base station operating conditions.

According to a third aspect of the present invention, there is provided a network node operable to generate, by genetic programming, evolved algorithms for adjusting base station transmission power to control coverage of a cell to assist in providing desired base station operating characteristics, the network node comprising: generating logic operable to generate, using predetermined functions and terminals defined in a functions and terminals list, a plurality of evolved algorithms each of which determine whether, for any particular base station operating conditions, to adjust the base station transmission power; determining logic operable to determine a fitness level indicative of each evolved algorithm's ability to adjust base station transmission power to control coverage to achieve the desired base station operating characteristics under expected operating conditions; and control logic operable to control the generating logic and determining logic to iteratively generate a further plurality of evolved algorithms using at least one of the evolved algorithms determined to have achieved a particular fitness level.

In one embodiment, the functions comprise at least a conditional statement operable to select from different outcomes based on a relationship between a base station operating condition and its corresponding desired base station operating characteristic.

In one embodiment, the conditional statement comprises an if_else statement operable to select a first outcome when the particular base station operating condition is greater than a predetermined threshold related to the corresponding desired base station operating characteristic and else to select a second outcome.

In one embodiment, the conditional statement comprises an if_X_large statement operable to select a first branch when X is larger than a predetermined threshold $X_{thr}$ and else to select a second branch. It will be appreciated that X may comprise one or more operating characteristics such as, for example, the coverage overlap O, the coverage gap D and the load L. It will be appreciated that the predetermined threshold $X_{thr}$ may comprise one or more genetic operator thresholds such as, for example, the proportion of measurement reports indicating more than one received pilot channel $O_{THR}$, the probability of users entering a coverage gap $D_{THR}$ and the maximum load capacity $L_{THR}$.

In one embodiment, the terminals comprise at least one of an increase, a decrease and no change in base station transmission power.

In one embodiment, the determining logic is operable to simulate operation of a base station when using each of the evolved algorithms under the expected operating conditions to generate simulated operating metrics and to apply those simulated operating metrics to a fitness function representing the desired base station operating characteristics to determine the fitness level.

In one embodiment, operators of the fitness function are weighted to assist in adjusting the fitness function to represent adjustments in the desired base station operating characteristics.

In one embodiment, the fitness function comprises:

$$F = \frac{w_D(1-C_D) + w_O(1-C_O) + w_L C_L}{w_D + w_O + w_L}$$

where F is the fitness level, $C_O$, $C_D$ and $C_L$ are a simulated mean of coverage overlap metric, a simulated mean coverage gap metric and a simulated load metric, respectively, and $w_O$, $w_D$ and $w_L$ are weightings.

In one embodiment, $C_L$ is determined in accordance with the following algorithm:

$$C_L = \begin{cases} \frac{1}{N}\sum_{i=1}^{N} \frac{L_i}{L_{thr}} & \text{if } L_i \le L_{thr} \\ 0 & \text{otherwise} \end{cases}$$

where N is the total number of cells in the network, $L_i$ is the load experienced by the base station i and $L_{thr}$ is a threshold set at or below a maximum load capacity of that base station.

In one embodiment, the control logic is operable to select a desired one of the evolved algorithms and to create a decision table representative of the desired one of the evolved algorithms, the decision table being operable to indicate to a base station adjustments to the base station transmission power required for any particular base station operating conditions.

In one embodiment, the decision table contains an entry for each permutation of a relationship between a base station operating condition and an associated threshold, each entry indicating an adjustment to the base station transmission power required for that permutation In embodiments, the network node comprises one of a genetic programming unit and a base station. Accordingly, a genetic programming unit may be provided by the core network when operating a centralised approach or, alternatively, may be embodied in a base station when using a distributed approach.

According to fourth aspect of the present invention, there is provided a computer program product operable, when executed on a computer, to perform the method steps of the first or second aspect.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

An example wireless network and network node will now be described, before focussing in on an example genetic programming unit and its operation. After that, we will describe how a verified algorithm is disseminated to other nodes, before giving a particular example of the type of algorithm. This is followed by a description of some variants and alternatives.

In wireless networks, use of a large number of user-deployed small cells allow high data rates and provide high capacity. Such small cells typically have a range of tens or hundreds of meters, and are often referred to as femtocells, microcells or picocells. However, a side-effect of using such a large number of small cells is the diversity of environments which the base stations providing those cells would experience.

In this description we used the term algorithm to mean a set of rules or a method that is used to solve a problem or perform a task. An algorithm may be specified in the form of a mathematical formula having technical application, a computer program, a representation of a system's behaviour such as a state transition diagram or flowchart. Examples of algorithms in telecommunications network nodes are a method to automatically adjust the coverage area of a radio cell, and a method of routing traffic through a network router node.

Network

Figure 1:
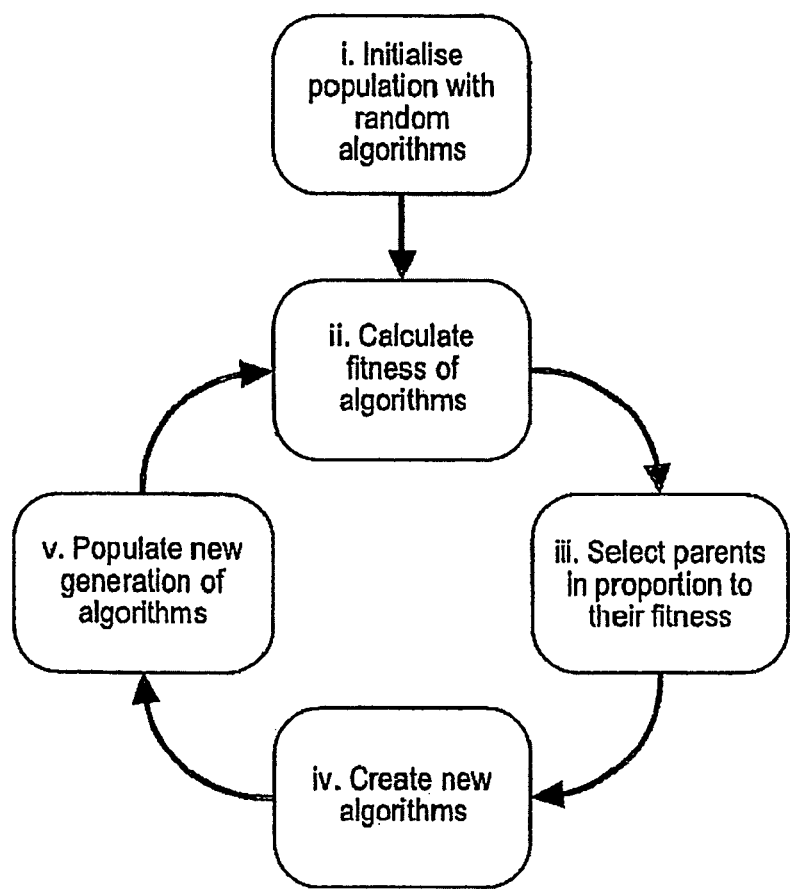
FIG. 1 is a diagram illustrating schematically a genetic programming process.
Figure 2:
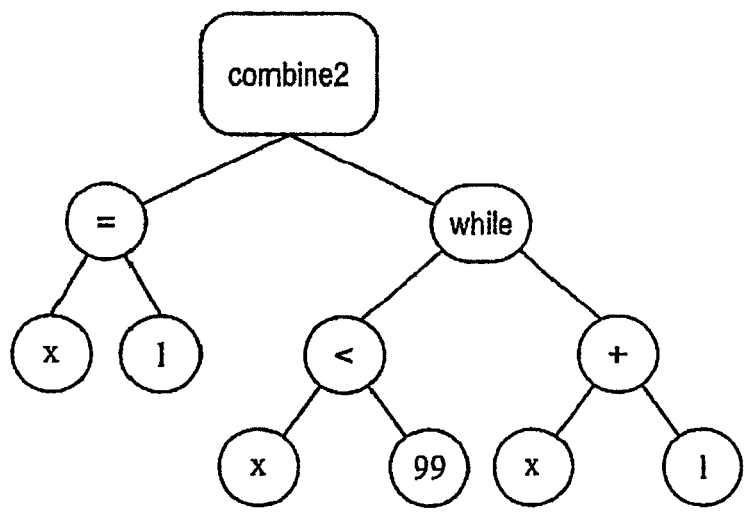
FIG. 2 is a diagram illustrating a computer program represented in the form of a parse tree.
Figure 3A:
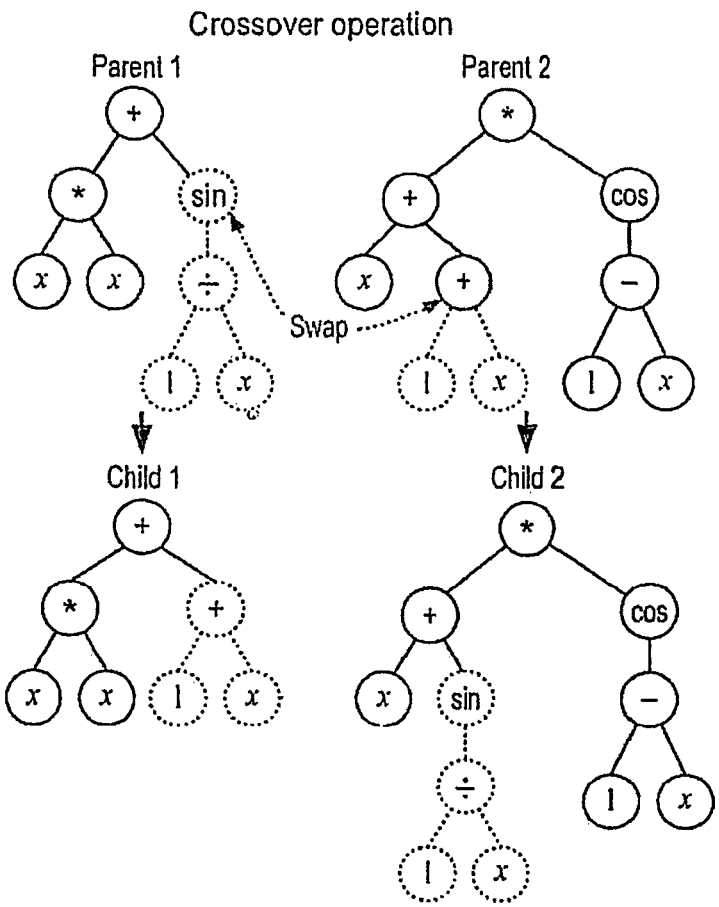
FIGS. 3a and 3b are diagrams illustrating crossover and mutation operations applied in genetic programming to program portions represented as parse trees.
Figure 3B:
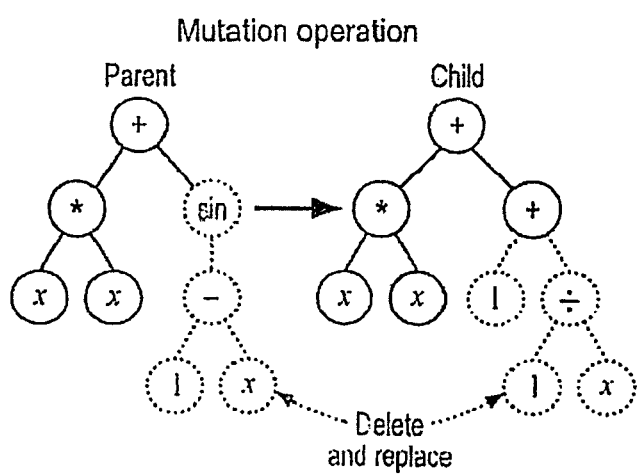
Figure 4:
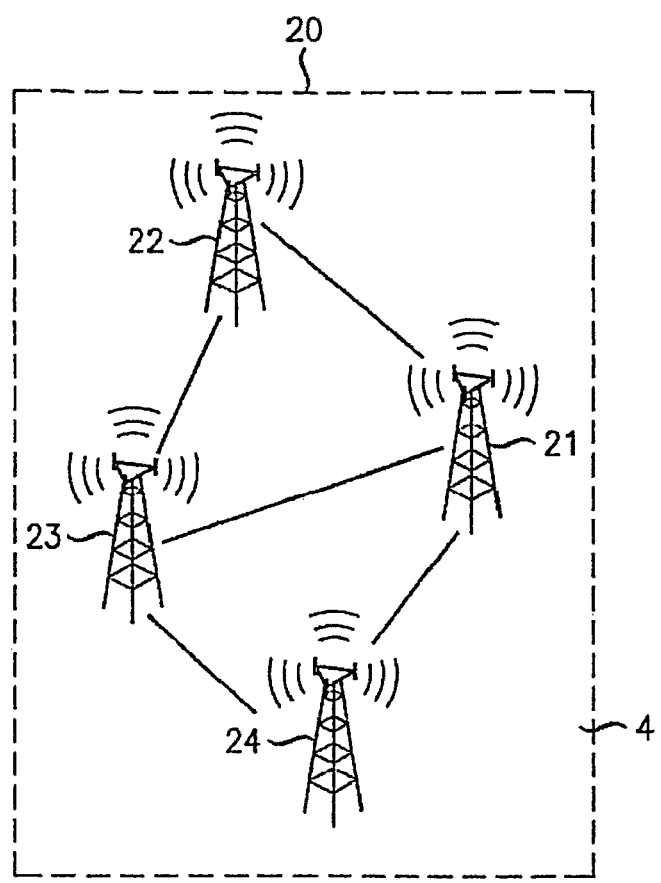
FIG. 4 is a schematic representation of a network for wireless telecommunications according to one embodiment.
Figure 5:
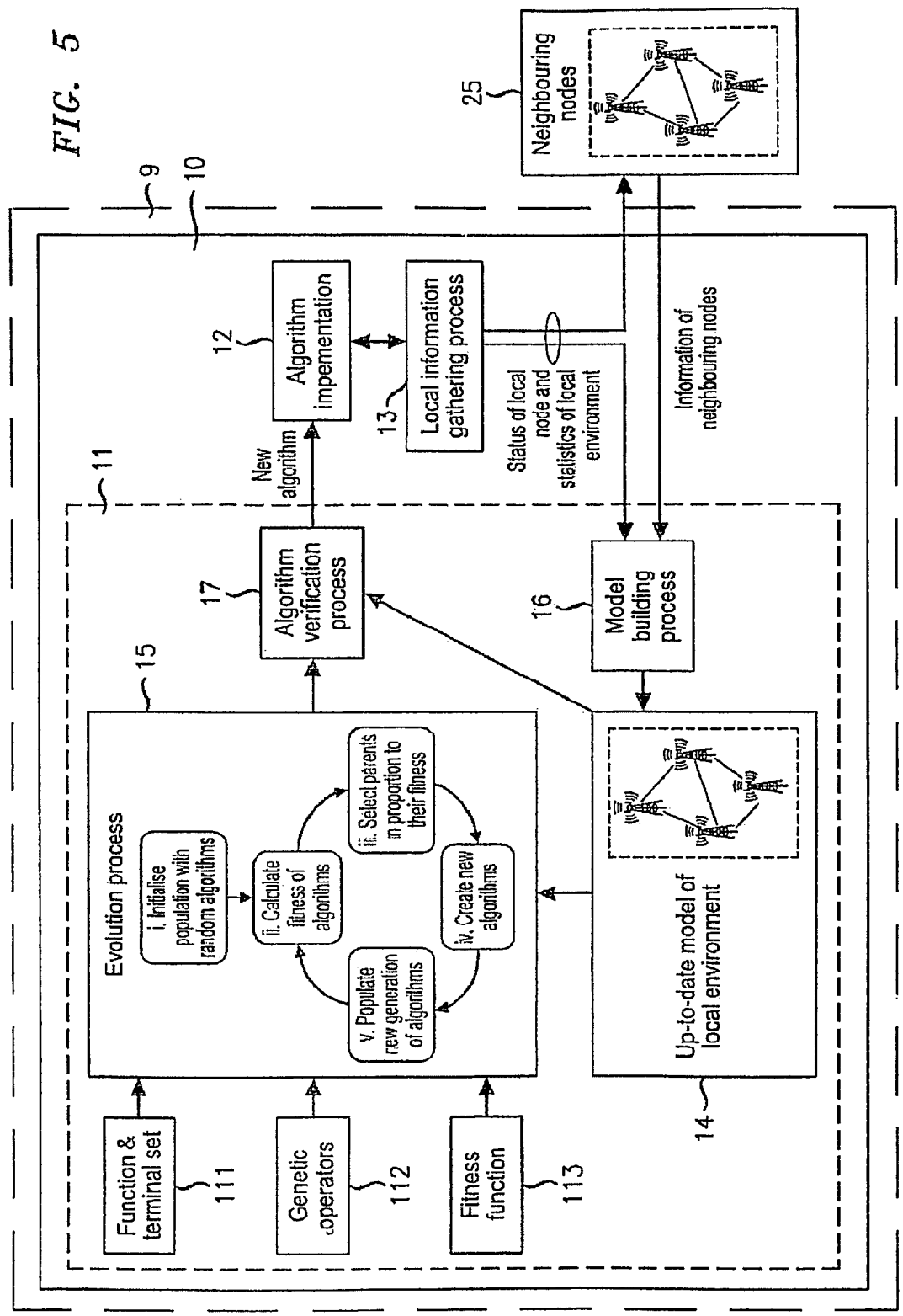
FIG. 5 is a diagram illustrating in more detail one of the base stations shown in FIG. 4 plus its neighbouring base stations.

As shown in FIG. 4, the telecommunications network 20 includes a radio access network 4 which includes some interconnected cellular base stations 21,22,23,24. The base stations 21,22,23,24 all run respective algorithms to perform a predetermined task. As shown in FIG. 5, each of the base stations includes a respective genetic programming unit 10 that is used to provide new improved versions of the algorithm using genetic programming, as explained in more detail below. Each of the base stations is operative to communicate with and sense its neighbouring base stations. For example a first base station 21 is operative to communicate with and sense its neighbouring base stations 22,23,24.

To avoid confusion, we shall refer to the particular base station being considered as the "local" base station 9, which has a group 25 of neighbouring base stations. For example, the local base station 9 may correspond with the cellular base station 21, which the group of neighbouring base stations being the cellular base stations 22,23,24. Which base stations belong to the group 25 depends on how the local base station 9 has discovered it neighbours. In this example, the local base station 9 performs measurements of received pilot signals from other base stations either directly or from measurement reports from user equipment supported by the local base station 9 so as to identify which of the base stations are in its group 25 of neighbours. In an alternative embodiment, the local base station performs a query-and-response procedure with the core network over the backhaul network in order to identify neighbours.

The base stations in the group 25 of neighbours are those that have a significant impact on the local base station 9, and vice versa. For example, increasing transmit power of base stations in the group 25 will increase interference to the local base station 9. As will be explained in more detail below, the base stations in the network 20 each run their own algorithms to perform certain tasks, such as adjusting the size of their radio coverage. The base stations also each run an algorithm adaptation process, using genetic programming, in order to periodically update and refine the exact functional forms of the algorithms that they run. Each base station refines their algorithms locally, so the end effect is that each base station runs their own respective algorithm optimised to suit their own local environment and so likely being unique.

Genetic Programming Unit

As shown in FIG. 5, the genetic programming unit 10 that uses genetic programming to create algorithms used in the base stations includes a genetic processor 11, an algorithm implementation stage 12 and a local information gathering stage 13. The genetic processor includes a function and terminal set 111, genetic operators 112 and a fitness function 113 as inputs to an evolution processor 15. The function and terminal set 111 are the building blocks of the algorithms. The genetic operators 112 are operations that manipulate existing algorithms to create new ones, and include operations such as mutation and crossover. The fitness function 113 is a function used to calculate the fitness, in other words performance of the algorithms. The fitness function 113 is predetermined based, for example, on the characteristics required by the network operator. In use, the evolution processor 15 acts to run simulations of the network node using the information of the model 14 of the network node and various different generated algorithms and the performance results are used together with the fitness function 13 to calculate the fitness associated with each algorithm. An up-to-date model 14, of the network node is used in these simulations.

As will be explained in more detail below, new and improved algorithms to be used in the base station are generated on an automatic basis. A flowchart of the main steps taken in this automated process is shown in FIG. 6.

Figure 6:
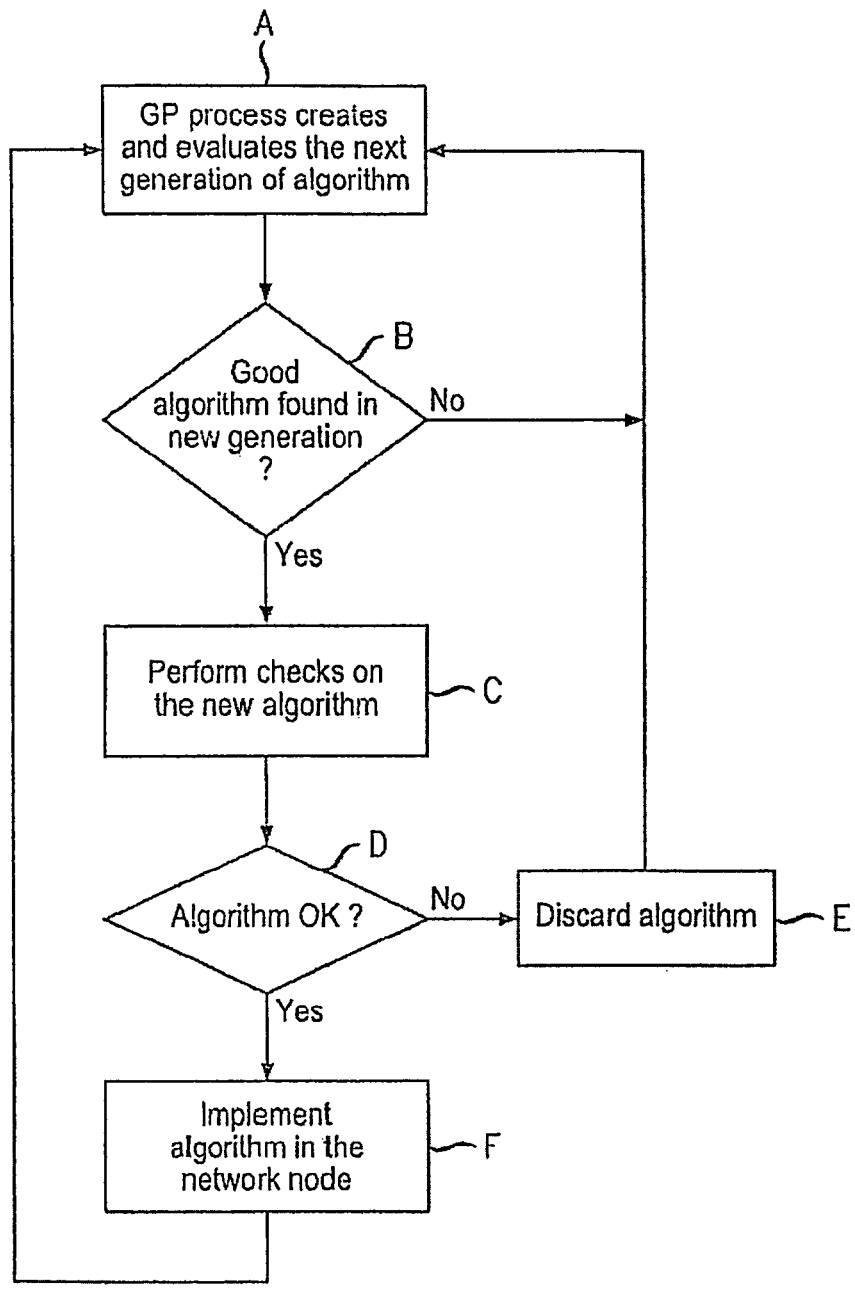
FIG. 6 is a flow chart illustrating operation of the genetic programming unit if the base station shown in FIG. 5.

As shown in FIG. 6, in the genetic programming unit 10, a next generation algorithm is generated and evaluated (step A) as to fitness level. A determination is made (step B) as to whether a generated algorithm meets a predetermined fitness level. Upon the predetermined fitness level being met, the algorithm is deemed good enough for the algorithm verification process to be undertaken. Alternatively, the best performing algorithms is selected. As explained above, the algorithm verification processor 17 may pre-test (step C) the algorithm to check suitability for deployment in the network 20. A determination is then made (step D) as to whether the tests are failed or passed. If the tests are failed the algorithm is discarded (step E) and a return is made to the generation and fitness evaluation (step A). On the other hand, if the tests are passed, then the algorithm is implemented (step F) in the network node.

The steps A and B in FIG. 6 occur in the evolution processor 15 shown in FIG. 5. The steps C, D, and E in FIG. 6 occur in the algorithm verification processor 17 shown in FIG. 5. This is explained in more detail below.

Various components and aspects of the genetic programming unit 10 will now be described in more detail. In particular, the evolution processor 15, the model building processor 14, the algorithm verification processor 17 and the algorithm implementation stage 12 will now be described.

Evolution Processor

The function and terminal set 111, genetic operators 112, a fitness function 113 and the simulation results from model (simulator) 14 are input to an evolution processor 15. The evolution processor 15 undertakes genetic programming.

As previously described, genetic programming (GP) involves the following steps:
  (i) initialise a population of algorithms—a population is the term used for a collection of individual algorithms, the algorithms in the initial population being generated at least somewhat randomly;

(ii) calculate the fitness of each of the algorithms in the population—fitness being the term used for a measure of the algorithms performance in achieving the task of the algorithm;

(iii) select algorithms to become "parents" based on their fitness;

(iv) create new algorithms by applying genetic operators, such as mutation and crossover to the parents selected in the previous step; and (v) produce the next generation population of algorithms using newly created algorithms and survivors chosen from the previous generation population.

The above steps (ii) to (v) are repeated until a termination condition is met (for example a target fitness level is met by an algorithm that has been created or a predetermined number of generations have been created).

It can be considered that the algorithm output from the evolution processor 15 is one that has been selected by the evolution process. This algorithm may optionally be output from the evolution processor 15 to an algorithm verification processor 17.

Model Building Process

In the genetic programming unit 10, there is a model building processor 16 which acts on the model 14 of the network node to keep the model 14 up to date by making use of information on the status of neighbouring nodes 25, such as what algorithm they are currently using plus the traffic conditions that they are experiencing such as load, type of calls etc, and also of local information about the local base station 9 itself.

The local information about the local node 9 itself is gathered by a local information gathering processor 13 that uses various tools to obtain information on the local radio environment, such as measurement reports sent by user terminals, and measurements made by a built-in radio receiver (not shown). This processor 13 also collects internal information that is available, such as statistics regarding the local base station's traffic load. This processor 13 also disseminates relevant information about the local base station 9, such as transmit power and average load in terms of numbers of active users, to its neighbours 25.

Accordingly, the model building processor 16 incorporates significant changes that occur in the radio environment and conditions applied to the base station so may have an impact on the algorithm evolution process, and also acts to refine the model 14 so as to improve its accuracy. Accordingly, the model changes by being updated from time to time, for example periodically. The model building processor 16 uses information on the network node that is obtained from the network node itself plus its neighbours.

Algorithm Verification

The algorithm verification processor 17 may pre-test the selected algorithm to check suitability for deployment in the base station. When required, the tests are done prior to deployment and are intended to ensure that the algorithm is well-behaved and will not cause unwanted behaviours to occur in the network. This testing is often particularly important for self-x algorithms (i.e. self-configuring, self-organising, etc.) for decentralised control of network nodes, as undesirable and unexpected behaviour may occur. Such undesirable behaviours can cause inefficient operation of the network and in extreme cases can cause cascading failures throughout the network. It should be noted that adverse effects can occur generally in algorithms and are not a specific side effect of being generated by genetic programming.

The algorithm verification processor 17 may perform an automated verification process. Although the selected algorithm from the evolution processor 15 was developed using simulated scenarios and an up-to-date model 14 of the base station in its local environment, the algorithm may have flaws causing undesirable outcomes in other scenarios. An example of such a flaw that is easy to detect is a divide-by-zero calculation. Accordingly this pre-testing may be undertaken.

Once the algorithm has been optionally pre-tested and deemed suitable, the algorithm is implemented in the network node.

Algorithm Implementation

The algorithm, now deemed suitable, is implemented in the network node by the algorithm implementation stage 12. This algorithm implementation stage 12 takes the algorithm in its parse tree form and translates that into software instructions that replace the previous algorithm used. The algorithm implementation stage 12 includes an algorithm reader (not shown) which either translates and runs the algorithm directly from its parse tree form, converts the parse tree into software code ($C_{++}$, Java) which is then compiled, or which converts the parse tree into a decision table, as will be described in more detail below.

Algorithm Dissemination to other Nodes

Figure 7:
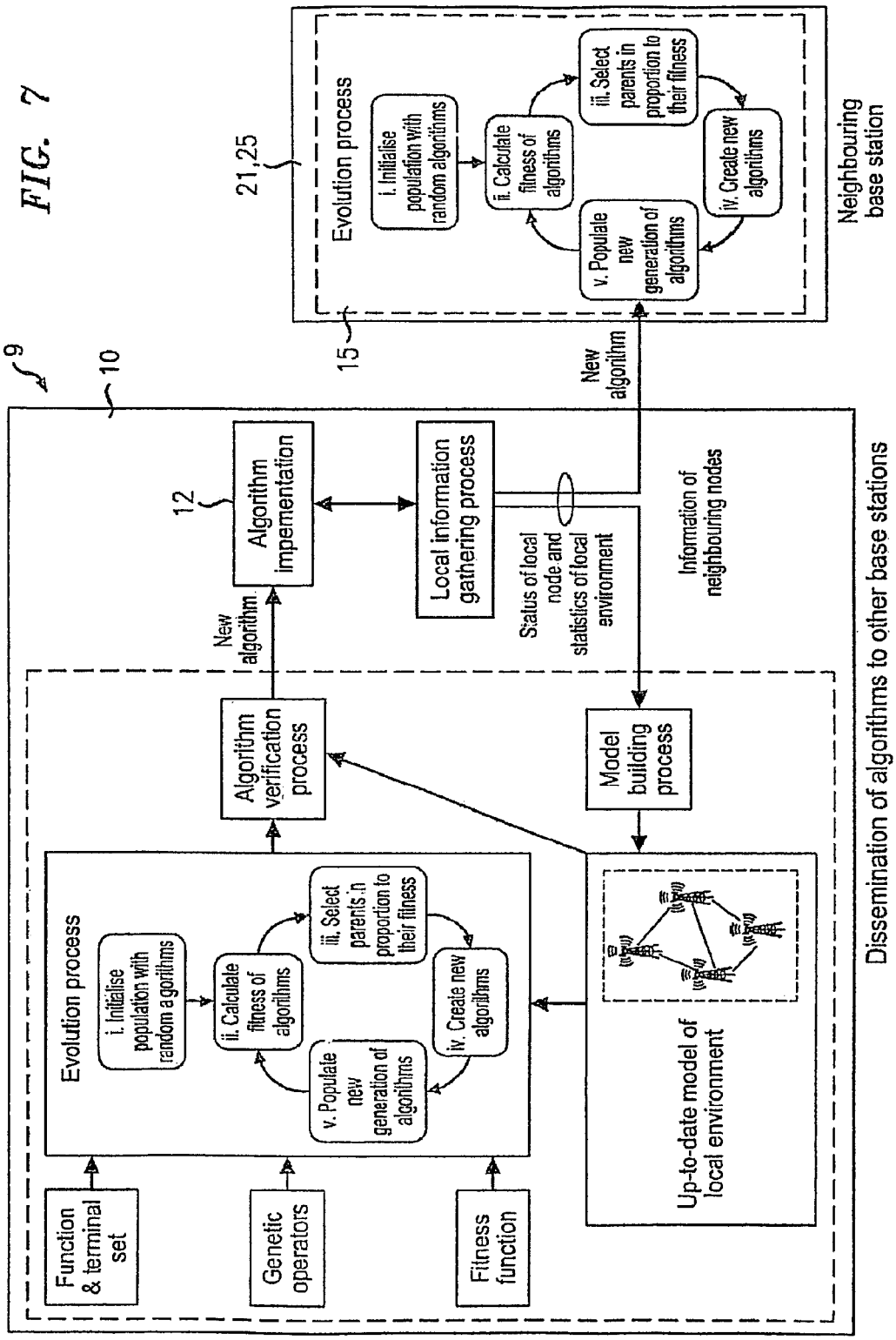
FIG. 7 is a diagram illustrating how an algorithm verified and implemented in one base station becomes a candidate algorithm in a neighbouring base station.

As shown in FIG. 7, the verified algorithm is also sent by the algorithm implementation stage 12 to the neighbouring base stations 25 (one of which denoted 21 is shown for simplicity) so as to be included in their evolution processes. Looking from the neighbour's perspective, when the base station 21 receives this algorithm from one of its neighbours, the base station 21 inserts the algorithm as an individual in the current population of algorithms in the evolution process.

The algorithms disseminated to neighbouring algorithms in this way are not immediately used by the neighbours, but only included in the population of the next generation of algorithms to be further evolved. This is shown in FIG. 7 where, from the perspective of the local base station 9, a neighbouring base station 21 receives the new algorithm of the local base station 9. If this received algorithm happens to be the best algorithm amongst the population of base station 21, then the genetic processor 15, as part of its usual operation, starts using that algorithm in subsequent cycles of evolution.

By this step, good algorithms evolved and verified in one base station are spread to other base stations. This may improve the rate of convergence of the algorithm adaptation processes through the network, in what can be seen as a form of parallel computation where the search is being performed by a group of base stations rather than individually. The spread of an algorithm may be limited due to the diverse environments that the base stations experience. For example, a good algorithm for base stations in a dense urban environment would not necessarily work well in a suburban or rural environment.

Dissemination of algorithms as described above, happens both to and from base stations, for example a base station sends good algorithms to its neighbours and also receives good algorithms from them.

Example of Type of Algorithm: Optimising Radio Coverage

The following example embodiment describes the creation of coverage optimisation algorithms using genetic programming. Although this embodiment is described in the context of coverage provided by femto cells supported by femto base stations, it will be appreciated that the techniques described have equal applicability to other cells supported by their corresponding base stations. The embodiment provides examples of the required set-up such as the building blocks and fitness function required to successfully evolve coverage optimisation algorithms which vary base station transmission power for a wide array of scenarios and requirements. As mentioned above, genetic programming provides evolutionary algorithms and so can be used to automate the creation of programs to perform a certain task. These can be viewed as a specialised form of genetic algorithms. Genetic programming evolves programs that use, typically, a tree structure chromosomal representation and is often able to come up with novel designs that out-perform manually to derived designs. Accordingly, the basic intent is to apply genetic programming to locate self-x algorithms for controlling transmission power that produce globally good behaviour in the whole network. To enable genetic programming to be successfully applied, it is necessary to specify the function and terminal set 111, the genetic operators 112 and the fitness function 113 to be used during genetic programming.

The functions are entities that associate an input to a corresponding output, or a subroutine with an input that performs specific task. Terminals are typically either variables (which may represent inputs from sensors, or a variable indicating the state of a system), constants or functions that have no explicit input arguments. The fitness function is a function that assigns a quality measure to the individually-evolved algorithms and are used in the genetic programming process to represent the requirements or characteristics that the evolution should adapt to; it forms the basis of the selection process and drives the persistence and refinements of desirable traits in subsequent generations. The fitness function can be very simple and typically contains what it is desired to maximise or minimise, for example, throughput, delay, revenue, coverage, overlap, load, etc. The fitness function does not require a detailed understanding of the system but the correct specification of the fitness function is important, particularly if the characteristics can be composed of many different factors.

This example seeks to enable the automatic generation of solutions to solve the joint coverage optimisation problem in a distributed manner based on locally available information. This is achieved by using a particular combination of terminals, functions and fitness function with the genetic programming approach to evolve useful solutions.

The resulting solution is highly scalable and can adapt to different deployment scenarios when using a centralised or offline optimisation algorithm. When combined with a distributed or online design of the algorithms, this further increases the flexibility of the resulting solutions to new challenges that were unpredictable at the time of the initial design. Accordingly, in order to reduce the amount of network signalling and to increase its stability, the genetic programming procedure is set up to generate decentralised algorithms, where decisions are made by individual cells using only locally available information. Of course, it will be appreciated that it is possible to also perform this process in a centralised manner.

The functions and terminals used are described in table 1 below:

TABLE 1

| Function and terminal list | |
|---|---|
| | Description |
| Function Name | |
| if_L_large | If L is higher than a threshold $L_{thr}$, excecute branch 1, else, excecute branch 2. |
| if_O_large | If O is higher than a threshold $O_{thr}$, excecute branch 1, else, excecute branch 2. |

TABLE 1-continued

| Function and terminal list | |
|---|---|
| | Description |
| if_D_large | If D is higher than a threshold $D_{thr}$, excecute branch 1, else, excecute branch 2. |
| combine2 | Excecute branches 1 and 2 consecutively. |
| combine3 | Excecute each branches 1, 2 and 3 consecutively. |
| Terminal Name | |
| increasepow | Increase the pilot channel power by an increment. |
| decreasepow | Decrease the pilot channel power by an increment. |
| donothing | Do nothing (i.e. keep the pilot channel power unchanged). |

The functions if_L_large, if_O_large and if_D_large are specialised forms of simple if_else loops with the inputs from femto cell measurements built in directly. These specialised functions are used instead of basic if_else loops to speed up the discovery of useful algorithms. The thresholds used in these functions are set according to the requirements of the network. For example, the load threshold $L_{thr}$ may be set just below the maximum load capacity for the cell. The overlap threshold $O_{thr}$ may be set to, for example, 10% overlap, whereas the drop threshold Dthr may be set to 2% of dropped calls. These simple if_else loops determine whether the modelled or actual load is higher than the desired threshold and, if it is, will execute branch one and otherwise will execute branch two. Of course, it will be appreciated that the same effect could be achieved by a reverse scenario utilising an if_X_small function where if the value is lower than a threshold, then branch one is executed and else branch two is executed. The combined two and combined three functions cause the branches stemming from this function to be executed consecutively. The terminals are actions for the femto base station to increase and decrease the pilot channel power by a particular increment.

In an example office environment, the genetic operators 112 may be set as follows:
Population size: 100 (i.e. generate 100 different evolved algorithms during each iteration)
Cross over rate: 0.9
Mutation rate: 0.1
Maximum tree depth: 8
Maximum number of generations: 100
$L_{THR}$: 8 erlangs (the maximum load capacity of the femto cell)
$O_{THR}$: 0.3 (the number of measurement reports received indicating more than one pilot channel power measured above a threshold is 0.3 of the total number of pilot power measurements sent back by user equipment)
$D_{THR}$: 0.1 (which indicates a 10% probability of users entering a coverage gap).

The fitness function 113 is used by the genetic programming process to determine the quality of the evolved algorithms when applied to a whole network. Denoted by $F_{femto}$, the fitness function 113 describes the fitness of all the femto cells in the network:

$$F_{femto} = \frac{w_D(1 - C_D) + w_O(1 - C_O) + w_L C_L}{w_D + w_O + w_L}$$

where $C_D$ and $C_O$ are the mean of the probabilities of users entering a coverage gap and coverage overlap amongst all femto cells in the network. The load metric $C_L$ is defined as:

$$C_L = \begin{cases} \dfrac{1}{N}\sum_{i=1}^{N} \dfrac{L_i}{L_{thr}} & \text{if } L_i \le L_{thr} \\ 0 & \text{otherwise} \end{cases}$$

where N is the total number of femtocells in the network and $L_i$ is the load experienced by the femtocell i. $C_L$ increases as the femto cell takes up more load, but drops to zero when the femto cell exceeds a threshold, such as the capacity or slightly below the capacity of the femto cell (to prevent overloading).

These metrics are all normalized such that their values are $0 \le C_x \le 1$. Weights $w_O$, $w_D$ and $w_L$ are applied to each metric, so that it is possible to place more emphasis on different objectives according to the requirements of the network operator. In the example, all the weights are set to 1. The coverage gaps, overlap and load considered in this example are those of the whole network, rather than any one individual femto cell. This is so that the distributed algorithm is evolved to optimise the coverage globally. These parameters are typically used only to evaluate the global performance of the network and are not used by the distributed algorithms, who typically only use local information.

The function and terminal set 111, the genetic operators 112 and the fitness function 113 are utilised to derive evolved algorithms. As mentioned above, each evolved algorithm is utilised by the model 14 to simulate the operation of the femto base station when adjusting its pilot channel transmission power in accordance with that evolved algorithm under expected operating conditions. From the simulated operation of the femto base station when utilising that evolved algorithm it is possible to determine the performance of the base station under the expected operating conditions. This simulated performance can then be assessed using the fitness function to determine that evolved algorithm's ability to achieve the desired operating characteristics under the expected operating conditions.

Figure 8:
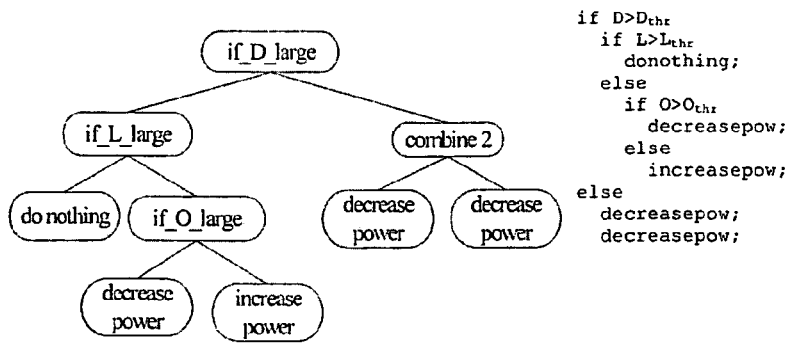
FIG. 8 is a simplified example genetically engineered algorithm for optimising radio cell coverage and its associated pseudo code.

In this example, after 100 generations, the algorithm assessed to have the greatest fitness level is selected. FIG. 8 shows an example extremely simplified algorithm and it's associated pseudo code. In practice, the devolved algorithms will be significantly more complex than this. The selected algorithm ought to have the greatest fitness level of all the algorithms generating during genetic programming and represent the algorithm most suited to achieving the desired characteristics of minimal overlap and gap, whilst maximising load under the expected operating conditions.

Whilst it is possible (subject to any verification that may be required) to utilise that algorithm directly within the base station, it is generally more desirable to generate a more simplified decision table as shown in table 2 below which can then be utilised by the base station rapidly, at a low processing overhead to determine the adjustments required to transmission power under different operating conditions.

TABLE 2

| Decision tree of evolved algorithm | | | |
|---|---|---|---|
| $L > L_{thr}$? | $O > O_{thr}$? | $D > D_{thr}$? | Modify pilot power by: |
| No | No | No | +2.0 dB |
| No | No | Yes | +2.5 dB |

TABLE 2-continued

| Decision tree of evolved algorithm | | | |
|---|---|---|---|
| $L > L_{thr}$? | $O > O_{thr}$? | $D > D_{thr}$? | Modify pilot power by: |
| No | Yes | No | +0.5 dB |
| No | Yes | Yes | +2.5 dB |
| Yes | No | No | −2.5 dB |
| Yes | No | Yes | −3.5 dB |
| Yes | Yes | No | −1.0 dB |
| Yes | Yes | Yes | −3.5 dB |

The decision table is generated by the inputting to the evolved algorithm, a value for each entry which satisfies the associated conditions. For example, the first entry in the table is derived by setting L to less than 8, O less than 0.3 and D to less than 0.1, inputting those set values into the model 14 and recording that the resultant output is to change the transmission power by +2.0 DB. This process is then repeated for every permutation shown and a resultant power change is calculated and recorded. This table is then transferred to or utilised by the base station.

It should be noted here that due to the stochastic nature of the evolution process, it is likely that a different algorithm is evolved for every evolution run. The decision table shown here is generated from an evolved algorithm which is the result of just one run of the genetic process and running the evolution process again would produce another algorithm. The resulting difference in the evolved algorithms may be slight, but there is also a possibility that algorithms that adopt different strategies are produced.

As mentioned above, the algorithm produced is one that adjusts the femto cell's pilot channel power (and hence, coverage area) affer collecting sufficient measurements and statistics. The statistics collected by the femto cell over the data collection period are the highest load experienced L the estimated coverage overlap O, and the probability of users entering a femtocell coverage gap D.

The unit for load, L considered here is voice traffic measured in Erlangs, although other metrics of load can be used. The overlap, O, is the proportion of a femto cell's total coverage area that is experiencing overlap with coverage from neighbouring femto cells. The overlap is approximated using measurements sent back by the user equipment. An area of overlapping coverage is defined as an area where the user equipment measures pilot powers above a threshold from more than one femto cell. The femto base station keeps track of the total number, $M_{thr>1}$, of received measurement reports received from user equipment where more than one pilot channel power measured by the user equipment is higher than a threshold. The overlap is estimated by the ratio of $M_{thr>1}$ to the total number of pilot power measurements sent back by the femto cell's users, $M_{total}$, i.e. $M_{TOTAL}$ i.e. $O = M_{THR>1}/M_{TOTAL}$.

The probability of users entering a femtocell coverage gap is calculated as $D = n_D/(n_D + n_F)$, where $n_D$ is the number of times a femto cell's user enters a coverage gap, which can be derived from the number of handovers between the femto cell and the underlay macro cell. Alternatively, if a macro cell underlay does not exist, no can be the number of times that users reports back pilot power measurements that are below a minimum threshold. $n_F$ is the total number of users that have left the femtocell via a femtocell-to-femtocell handover.

Figure 9:
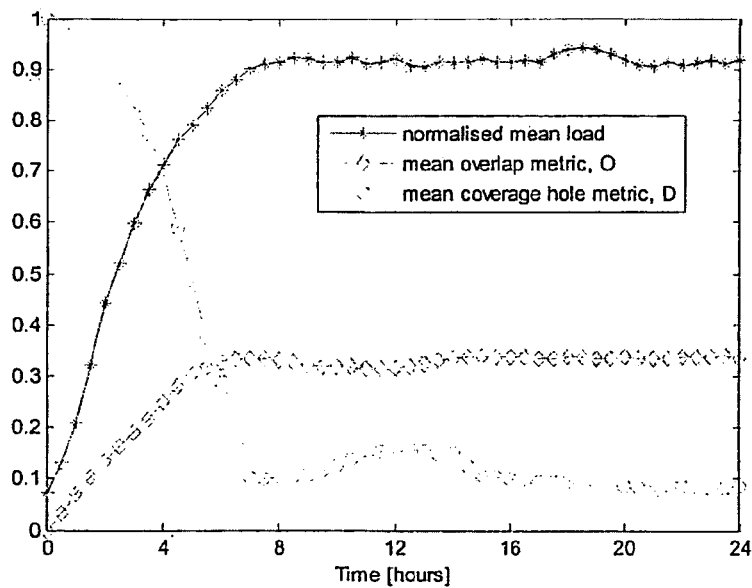
FIG. 9 illustrates load, gap and coverage metrics for a base station utilising an example genetically engineered algorithm for optimising radio cell coverage.
Figure 10:
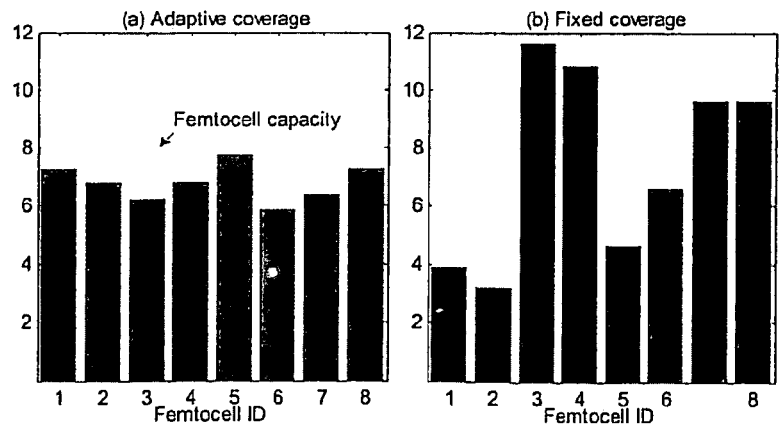
FIG. 10 illustrates the load maintained by an evolved algorithm compared to conventional deployment having a fixed transmission power.

As can be seen in FIG. 9, when utilising the evolved algorithm in the base station, the load, overlap and coverage closely converges to the thresholds set. Also, as can be seen in FIG. 10, the evolved algorithm maintains a load which is close to the femto cell capacity, whereas a conventional deployment having fixed transmission powers result in some base stations become under loaded whilst others become overloaded (and therefore have to reject call requests).

Hence, it can be seen that the approach described above enables the automatic creation of effective, distributed coverage optimisation algorithms for specific scenarios to achieve different objectives very quickly. For example, using network models of dense urban environments algorithms can be evolved that perform well in such environments, and can simply replace any network model used to produce algorithms that work well in rural environments. The fitness function used can easily be modified to include other performance metrics, such as algorithm convergence speed and signalling overhead. When used in conjunction with an online implementation of genetic programming, the technique enables the ability of base stations to automatically and continuously adapt and optimise their coverage algorithms in response to changes to the environment.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of generating, by genetic programming, evolved algorithms for adjusting base station transmission power to control coverage of a cell to assist in providing desired base station operating characteristics, said method comprising:

generating, using predetermined functions and terminals defined in a functions and terminals list, a plurality of evolved algorithms each of which determine whether, for any particular base station operating conditions, to adjust said base station transmission power;

determining a fitness level indicative of each evolved algorithm's ability to adjust base station transmission power to control coverage to achieve said desired base station operating characteristics under expected operating conditions, wherein the determining comprises simulating operation of a base station when using each of said evolved algorithms under said expected operating conditions to generate simulated operating metrics and applying those simulated operating metrics to a fitness function representing said desired base station operating characteristics to determine said fitness level; and iteratively performing the generating and determining to generate further evolved algorithms using at least one of said evolved algorithms determined to have achieved a particular fitness level.

2. The method of claim 1, wherein said functions comprise at least a conditional statement operable to select from different outcomes based on a relationship between a base station operating condition and its corresponding desired base station operating characteristic.

3. The method of claim 2, wherein said conditional statement comprises an if_else statement operable to select a first outcome when said particular base station operating condition is greater than a predetermined threshold related to said corresponding desired base station operating characteristic and else to select a second outcome.

4. The method according to claim 2, wherein the conditional statement comprises an if_X_large statement that selects a first branch when X is larger than a predetermined threshold $X_{thr}$ and selects a second branch when X is not larger that the predetermined threshold $X_{thr}$.

5. The method of claim 1, wherein said terminals comprise at least one of an increase, a decrease and no change in base station transmission power.

6. The method of claim 1, wherein operators of said fitness function are weighted to assist in adjusting said fitness function to represent adjustments in said desired base station operating characteristics.

7. The method of claim 1, wherein said fitness function comprises:

$$F = \frac{w_D(1-C_D) + w_O(1-C_O) + w_L C_L}{w_D + w_O + w_L}$$

where F is said fitness level, $C_O$, $C_D$ and $C_L$ are a simulated mean of coverage overlap metric, a simulated mean coverage gap metric and a simulated load metric, respectively, and $w_O$, $w_D$ and $w_L$ are weightings.

8. The method of claim 7, wherein $C_L$ is determined in accordance with the following algorithm:

$$C_L = \begin{cases} \frac{1}{N}\sum_{i=1}^{N} \frac{L_i}{L_{thr}} & \text{if } L_i \leq L_{thr} \\ 0 & \text{otherwise} \end{cases}$$

where N is the total number of cells in the network, $L_i$ is the load experienced by the base station i and $L_{thr}$ is a threshold set at or below a maximum load capacity of that base station.

9. The method of claim 1, comprising:
selecting a desired one of said evolved algorithms and creating a decision table representative of said desired one of said evolved algorithms, said decision table being operable to indicate to a base station adjustments to said base station transmission power required for any particular base station operating conditions.

10. The method of claim 9, wherein said decision table contains an entry for each permutation of a relationship between a base station operating condition and an associated threshold, each entry indicating an adjustment to said base station transmission power required for that permutation.

11. The method according to claim 10, wherein the adjustment to the base station transmission power required for each permutation is calculated by applying base station operating conditions representative of the given permutation to the desired one of the evolved algorithms.

12. A computer program product encoded with computer-executable instructions for performing the method claim 1.

13. A method of utilizing an evolved algorithm for adjusting base station transmission power to control coverage of a cell to assist in providing desired base station operating characteristics, said method comprising:
determining base station operating conditions; and
applying said base station operating conditions to said evolved algorithm to determine whether to adjust said base station transmission power, wherein said base station operating conditions comprise at least one of a base station load, a coverage overlap and a coverage gap, and determining comprises a corresponding at least one of:
determining said base station load by measuring a highest load experienced by a base station over a predetermined period;
determining said coverage overlap from received measurement reports indicating transmissions received from other base stations having a power greater than a predetermined threshold; and
determining said coverage gap from information received indicative of at least one of numbers of handovers and numbers of dropped calls due to lack of coverage which have occurred.

14. A network node operable to generate, by genetic programming, evolved algorithms for adjusting base station transmission power to control coverage of a cell to assist in providing desired base station operating characteristics, said network node comprising:
generating logic operable to generate, using predetermined functions and terminals defined in a functions and terminals list, a plurality of evolved algorithms each of which determine whether, for any particular base station operating conditions, to adjust said base station transmission power;
determining logic operable to determine a fitness level indicative of each evolved algorithm's ability to adjust base station transmission power to control coverage to achieve said desired base station operating characteristics under expected operating conditions, wherein the determining logic simulates operation of a base station when using each of the evolved algorithms under the expected operating conditions to generate simulated operating metrics and applies the simulated operating metrics to a fitness function representing the desired base station operating characteristics to determine the fitness level; and
control logic operable to control said generating logic and determining logic to iteratively generate a further plurality of evolved algorithms using at least one of said evolved algorithms determined to have achieved a particular fitness level.

15. The network node of claim 14, wherein said network node comprises one of a genetic programming unit and a base station.

* * * * *